June 16, 1931.  A. GERTH  1,810,075
LUG FOR WHEEL CHAINS
Filed April 19, 1930
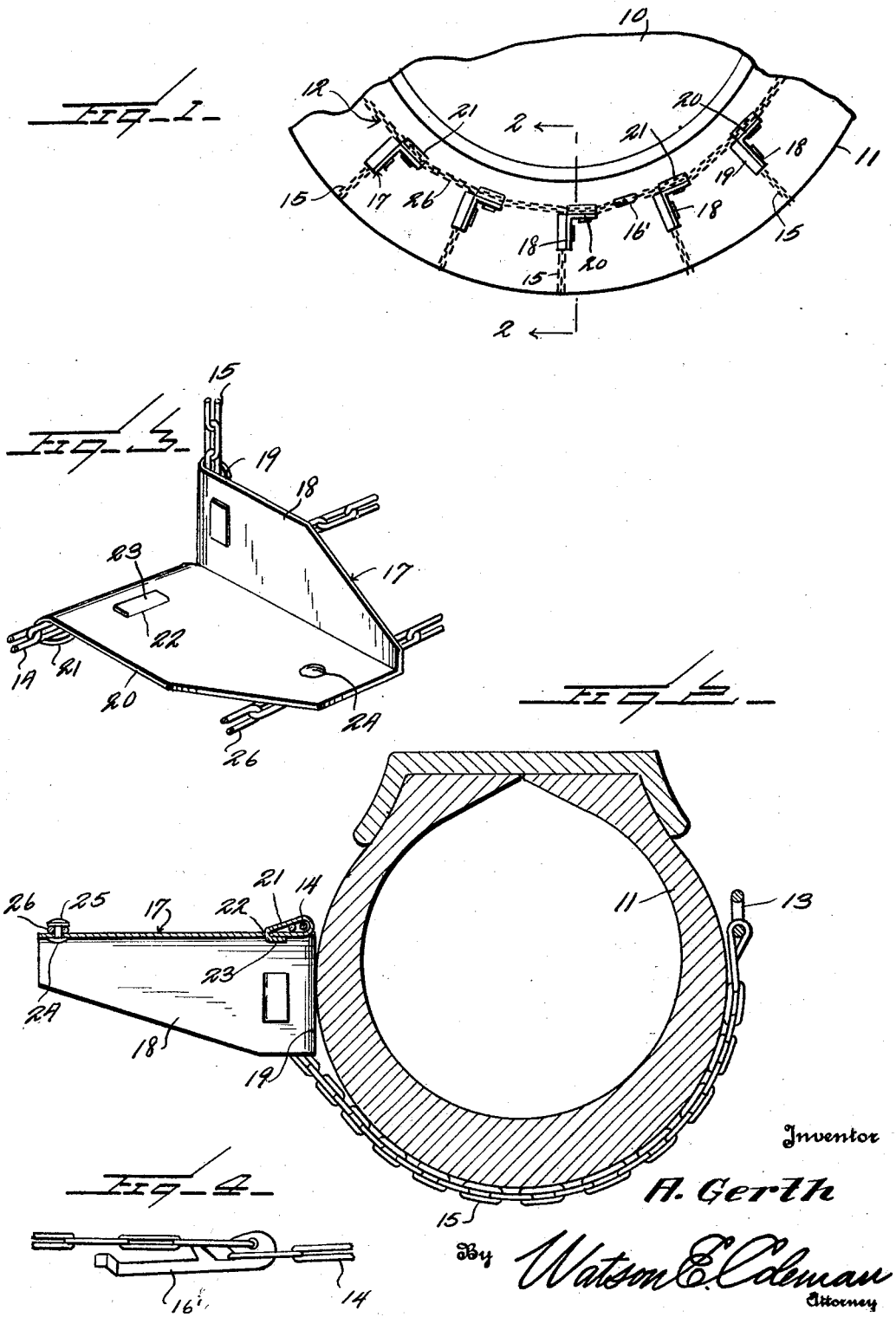

Patented June 16, 1931

1,810,075

UNITED STATES PATENT OFFICE

AUGUST GERTH, OF HIDEWOOD TOWNSHIP, DEUEL COUNTY, SOUTH DAKOTA

LUG FOR WHEEL CHAINS

Application filed April 19, 1930. Serial No. 445,691.

This invention relates to attachments adapted to be mounted on a vehicle wheel so as to increase the traction of the wheel in deep snow or mud.

An object of this invention is to provide a lug in combination with a chain which is adapted to be mounted on the periphery of a tire and which is adapted to extend outwardly or transversely of the tire so as to facilitate the traction of the tire in snow or mud.

Another object of this invention is to provide a traction device of this character which is so constructed that it will not contact with the ground when the vehicle is travelling over a relatively hard surface, the circumference of the attachment being relatively smaller than the circumference of the tire so that it will be maintained in spaced relation to the ground or road when the road is relatively hard.

A further object of this invention is to provide in combination with a device of this character, means for tensioning the chain positioned about the tire so as to maintain the lugs at substantially right angles to the side of the tire.

A still further object of this invention is to provide a plurality of lugs which are adapted to be positioned on the cross chains of a conventional anti-skid chain, the lugs being positioned at substantially right angles to the tire and having bracing means adjacent the outer ends of the lugs so that the lugs will be prevented from bending inwardly against the side of the tire.

The above and various other objects and advantages of this invention will in part be described in and in part be understood from the following detailed description of the present preferred embodiment, the same being illustrated in the accompanying drawings wherein:—

Figure 1 is a fragmentary detail side elevation of a device constructed according to the preferred embodiment of this invention and mounted on a vehicle wheel;

Figure 2 is a sectional view taken on the line 2—2 of Figure 1;

Figure 3 is a detail perspective view of one of the traction lugs; and

Figure 4 is a fragmentary detail view of the locking members for the chain sections.

Referring to the drawings wherein like numerals of reference designate corresponding parts throughout the several views, the numeral 10 designates generally a wheel upon which is mounted a tire 11. The wheel 10 may be of any conventional construction such as the wheel of an artillery type or of a disc construction, and the numeral 12 designates generally an anti-skid chain 12 having an inner and an outer side chain member 13 and 14 respectively.

The anti-skid chain 12 is also provided with a plurality of cross chain members 15 which are spacedly positioned about the periphery of the tire, and the outer side chain 14 may be of split construction having a tensioning member 16 at one end thereof which is adapted to engage in the opposite end of the chain for holding the anti-skid chain 12 upon the periphery of the tire.

A plurality of traction lugs generally designated as 17 are secured to the anti-skid chain 12 and are adapted to stand outwardly from the side of the tire. The traction lug 17 comprises a radially disposed plate member 18 which may be of tapering construction having the narrowest part outwardly of the tire and the inner end of the plate member 18 is provided with a looped portion 19 for loosely receiving one of the cross chains 15. The traction lug 17 is also provided with a second plate member 20 which is angularly disposed with respect to the plate member 18, and the plate member 20 is provided with an inner loop 21 for loosely receiving the outer side chain 14.

The plate members 18 and 20 may be formed integrally and the loop members 19 and 21 may also be formed integrally with the plate members 18 and 20. In order to securely hold the loop portions 19 and 21 so as to prevent opening thereof the plate members 18 and 20 are provided with an elongated slot 22 into which a tongue 23 is adapted to extend, the tongue 23 being bent reversely so as to prevent removal thereof from the slot 22.

A bolt or rivet 24 is positioned adjacent the outer end of the plate member 20 and is preferably provided with a headed portion 25, and an endless chain 26 is adapted to be secured to each of the bolts or studs 24 on the circumferential plate members 20 so that the loop 21 together with the plate 20 will not only brace the radially disposed lug 18 but the chain 26 will prevent twisting or turning of the lug against the side of the tire and will also brace the lug 18.

Preferably, the chain 26 is broken at one point and provided with a locking member 16' which is similar to the locking member 16 on the outer side chain 14, the locking member 16' being of a type which is provided with a plurality of hooks or notches so as to take up any play caused by stretching or the like of the chain.

In the use of this device, the anti-skid chain 12 is adapted to be positioned on the periphery of the tire 11, being tightly secured thereto by means of the locking member 16, and the lug members 18 are adapted to extend outwardly of the outer face of the tire. While I have shown the lug members 18 as being positioned only upon the outer face of the tire, I of course do not wish to be limited to this construction as this construction has been designed particularly for use in passenger vehicles or the like where the fenders or mud guards prevent any traction member of this type from being mounted on the inner side of the tire, but it is of course understood that in the case of trucks or vehicles which are so constructed that the tire stands away from the mud guard a considerable distance or where no mud guard is provided, the lugs 18 may be positioned on either the inner or the outer side of the tire or on both sides.

When the ends of the outer chain 14 have been secured in the locking link 16, the locking link 16' may be secured to the free ends of the chain 26 which is positioned on the outer edge of the lugs 18. The outer edge of the lugs 18, when the tire is fully inflated, is adapted to be positioned at a point spaced from the road or ground so as not to strike the road where the surface of the road is relatively hard.

Where the surface of the road is soft or where a considerable quantity of snow has been encountered, the tire will of course sink into the road or the snow whereupon the lugs 18 will coactively sink into the snow or the road and function as traction members. Due to the fact that the diameter or the distance between the diametrically opposed lugs is less than the diameter of the tire when the tire passes out of the deep snow or the road, the lug members 18 will be held out of engagement with the road and therefore not interfere with the movement of the tire.

It will, of course, be understood that various changes and modifications may be made in the details of construction and design of the above specifically described embodiment of this invention without departing from the spirit thereof, such changes and modifications being restricted only by the scope of the following claims.

What is claimed is:—

1. In combination with an anti-skid chain, a traction member adapted to be secured to the chain and extend outwardly of the tire, said traction member comprising a radially disposed plate member, means for securing said plate member to said anti-skid chain, a circumferentially disposed plate member, secured to said first plate member, a flexible member secured to said circumferential plate outwardly of the side of the tire, and means for securing said second plate member to the side of the anti-skid chain, said circumferentially disposed plate member being adapted to brace said radially disposed plate member against the side of the tire.

2. In combination with an anti-skid chain having a plurality of cross chains adapted to be mounted on the periphery of a tire, a radially disposed traction lug, means for securing said lug to one of said cross chains, a bracing member for said lug, flexible bracing means connecting the lugs together and means for securing said bracing member to a side chain of said anti-skid chain.

3. In combination with an anti-skid chain having a plurality of spaced cross chains, a plurality of radially disposed outstanding traction lugs, means for securing said traction lugs to said cross chains, a bracing member integrally formed with said traction lug, means for securing said bracing member to a side chain, and a circumferentially disposed bracing member secured to each of said first bracing members.

4. In combination with an anti-skid chain having a pair of side chain members and a plurality of spaced cross chain members, a plurality of tapering traction lugs, means for securing said lugs to the cross chains, a bracing plate secured to said traction lug and integrally formed therewith, said bracing plate being adapted to brace said lug whereby to prevent swinging movement thereof on said cross chains, said bracing plate being also adapted to prevent sinking of the lug into soft material, and a circumferentially disposed bracing member secured to each of said plate members.

5. In combination with an anti-skid chain having a pair of side chain members and a plurality of spaced cross chains secured to said side chains of a traction lug, means for securing said traction lug to said cross chains, said securing means comprising a looped inner end portion, a bracing plate integrally formed with said lug and angularly inclined therefrom, means for securing said lug to one of said side chains, said securing means comprising a loop positioned on the inner end of said plate member, said loop loosely engaging the side chain, a circumferentially disposed bracing member, and means for securing said circumferentially disposed bracing member to said plate member.

In testimony whereof I hereunto affix my signature.

AUGUST GERTH.